Dec. 24, 1968    A. J. RICH ET AL    3,418,650
IN AND OUT REGISTER AND PAGER SYSTEM HAVING INDICATORS
AT REMOTE AND CENTRAL STATIONS
Filed April 26, 1965    8 Sheets-Sheet 5
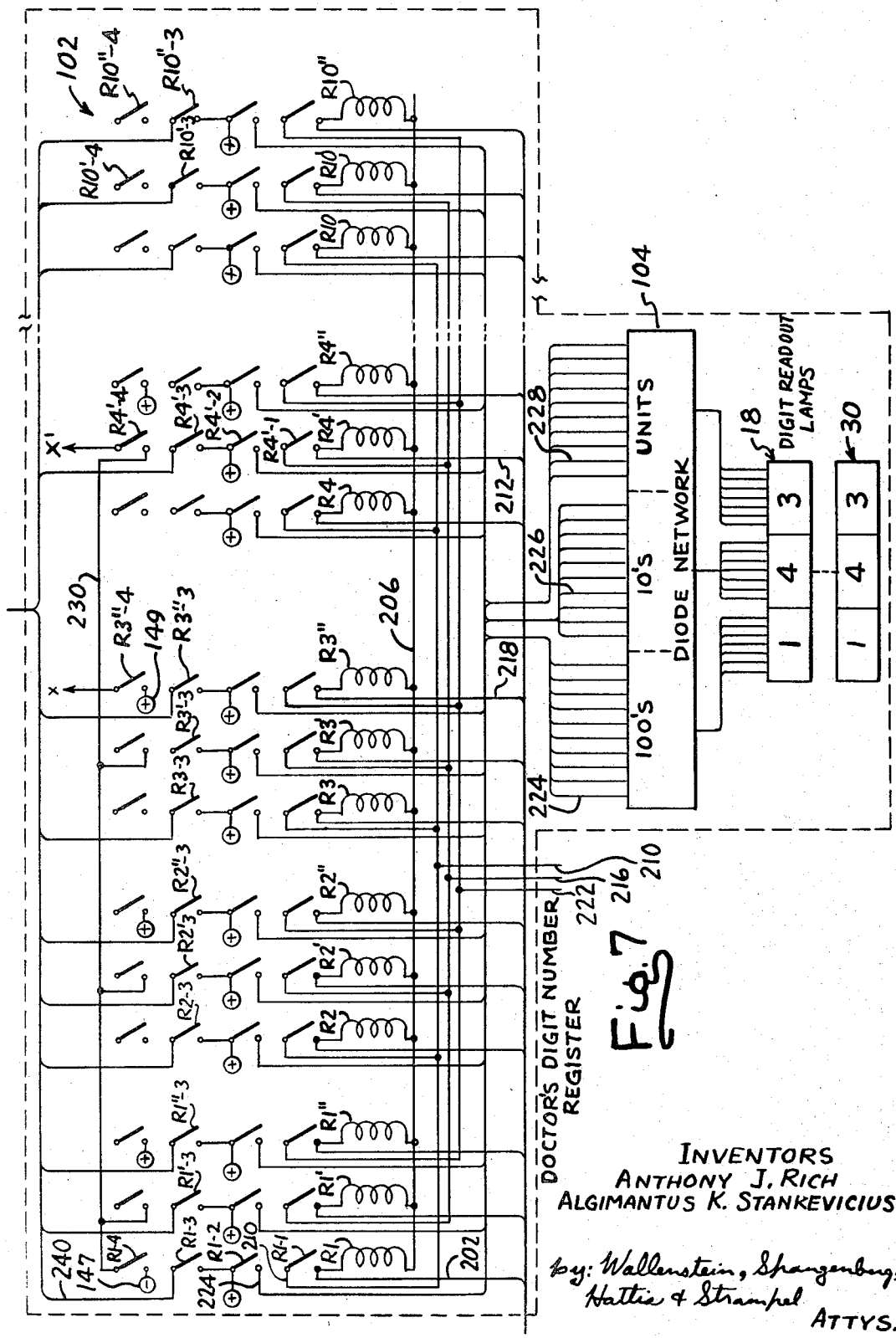
INVENTORS
ANTHONY J. RICH
ALGIMANTUS K. STANKEVICIUS
by: Wallenstein, Spangenburg,
Hattis & Strampel
ATTYS.

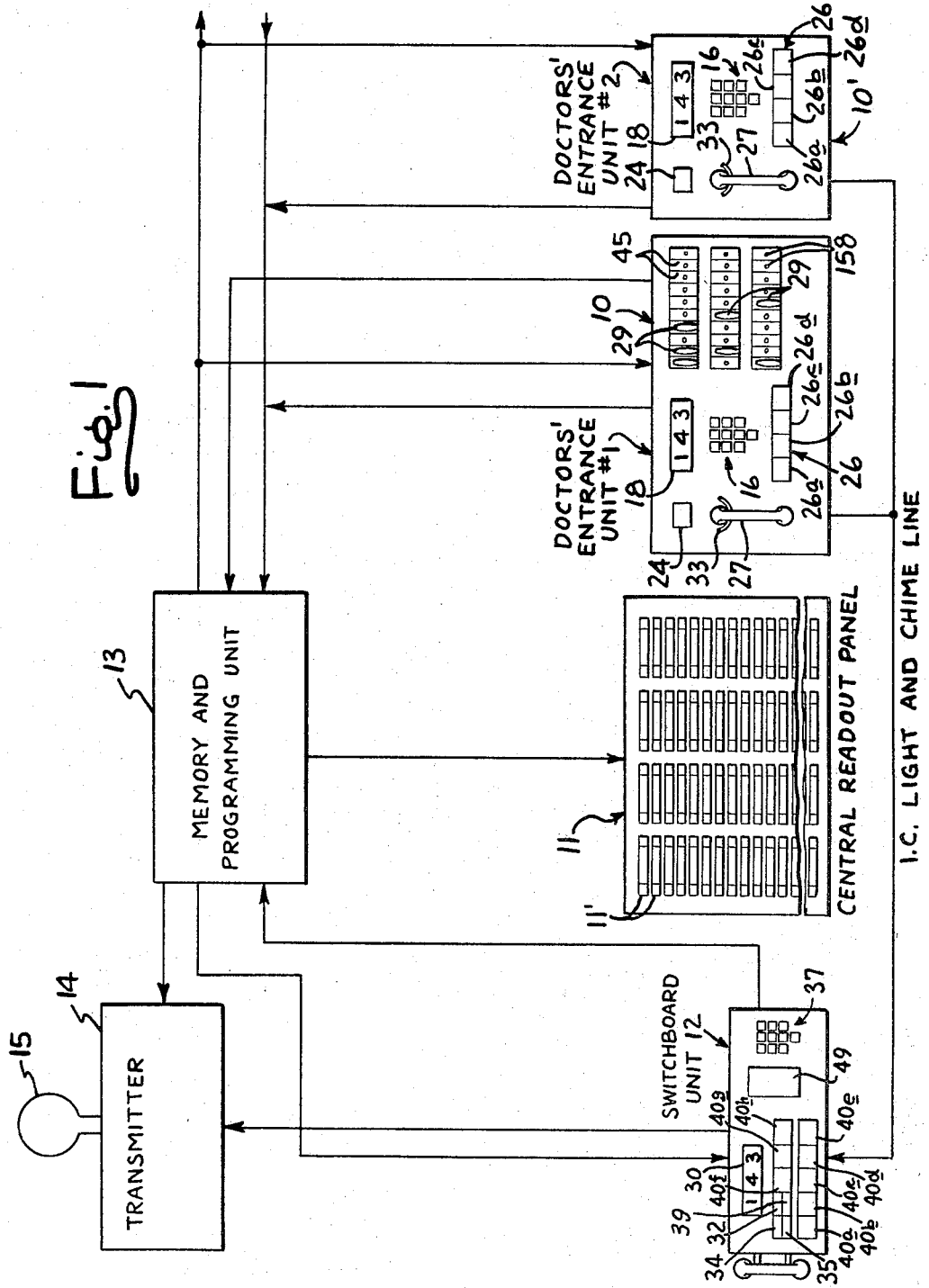

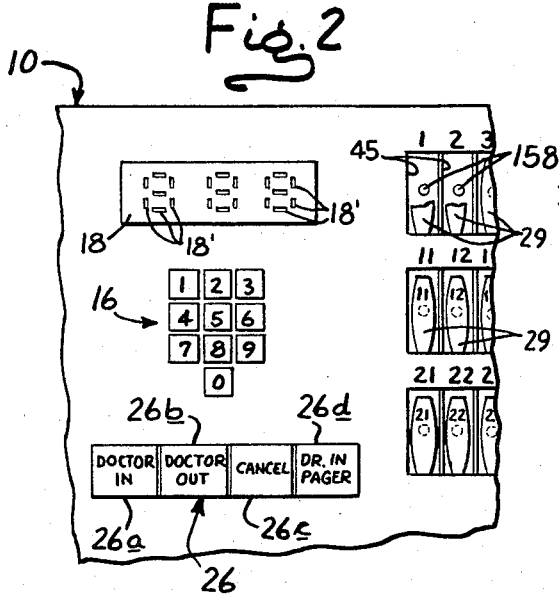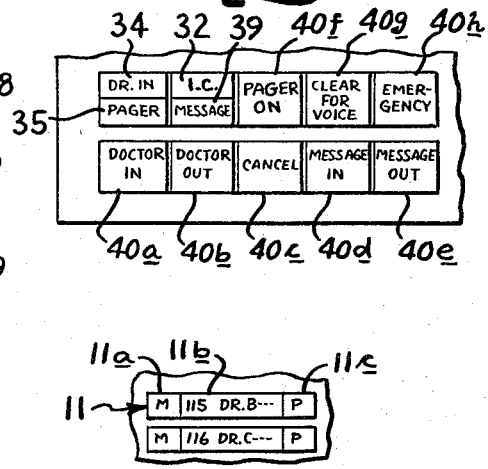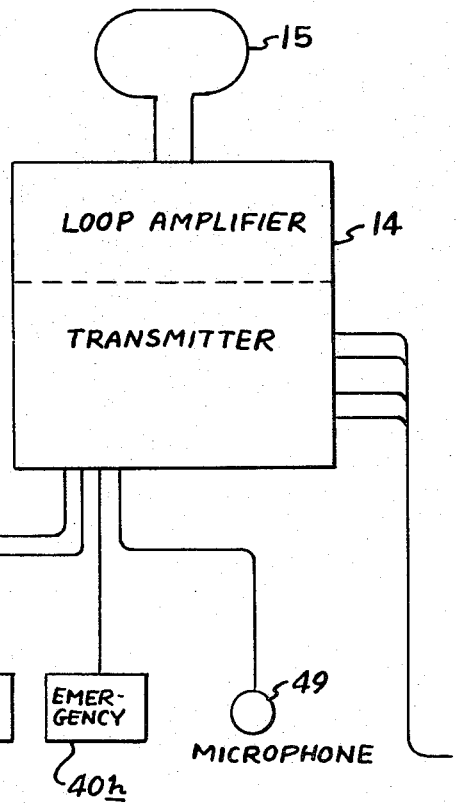

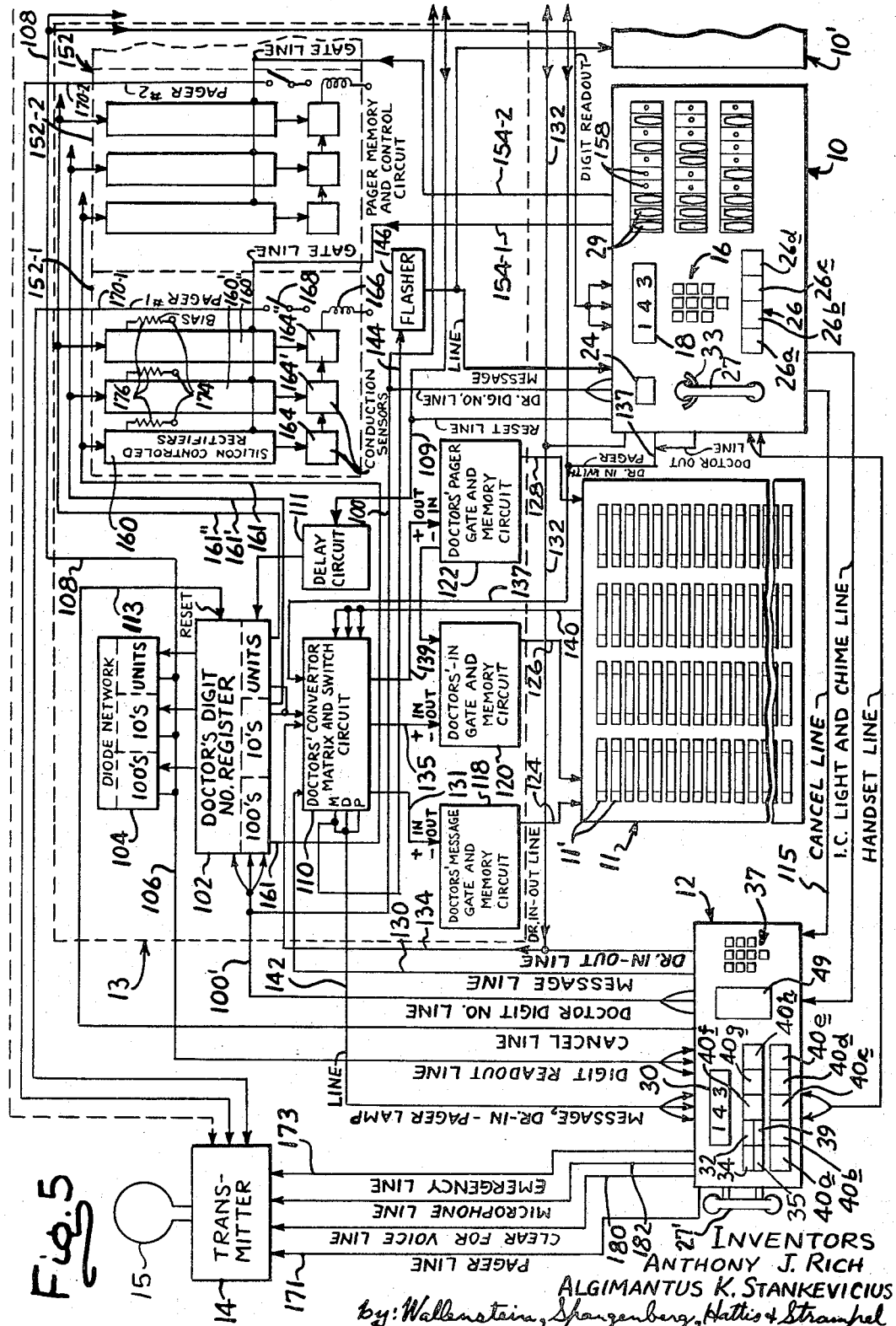

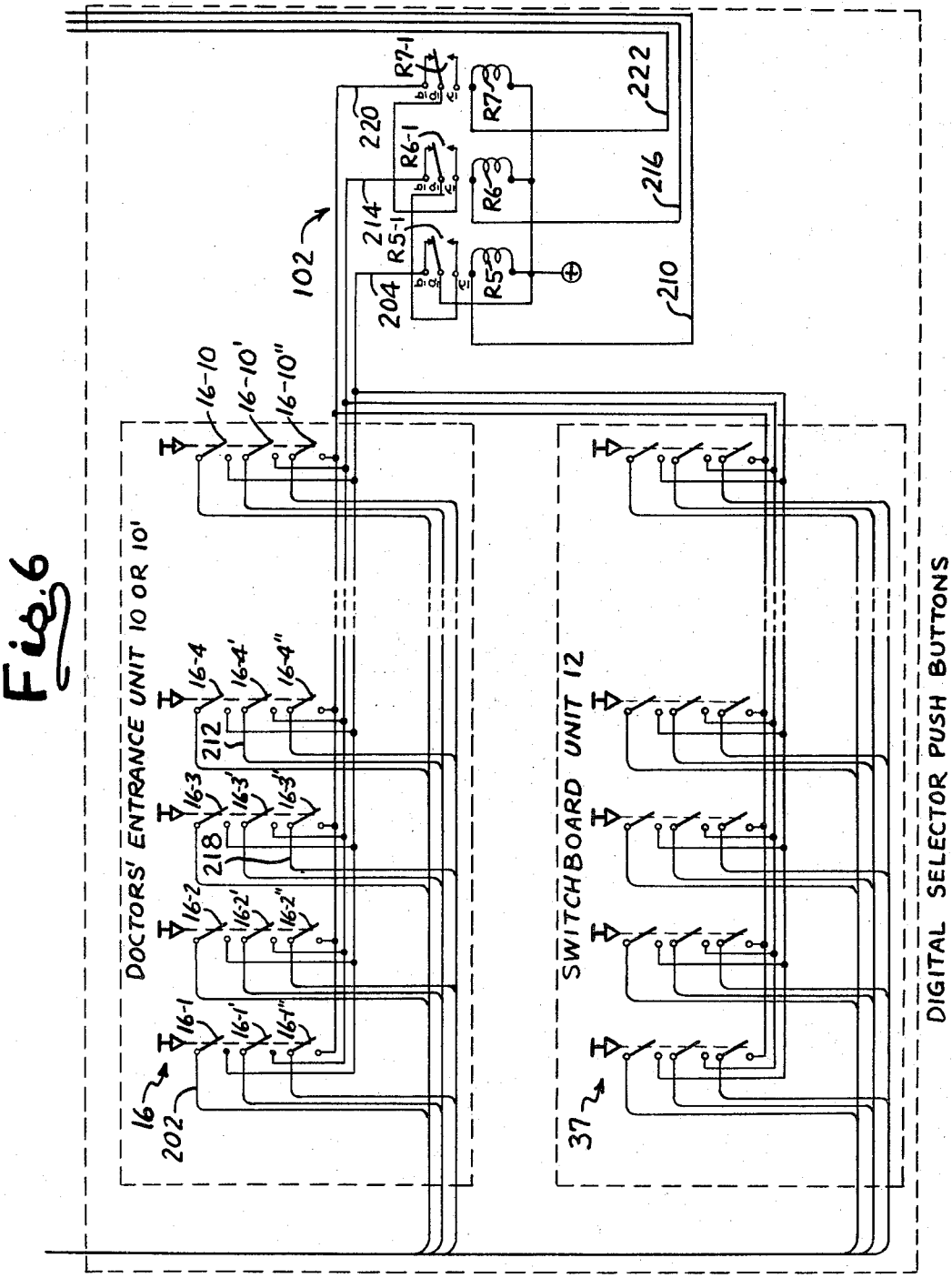

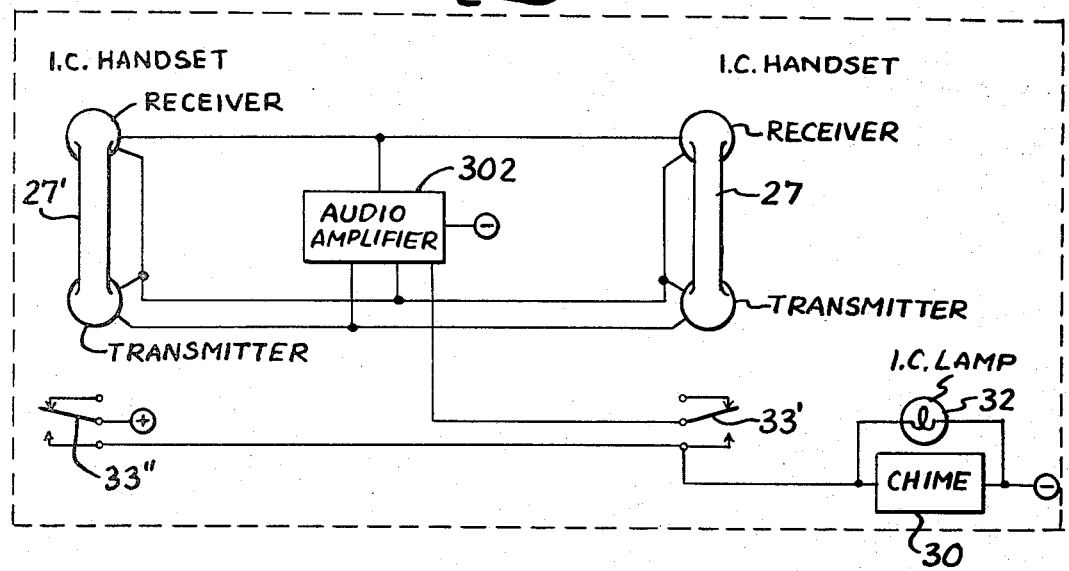

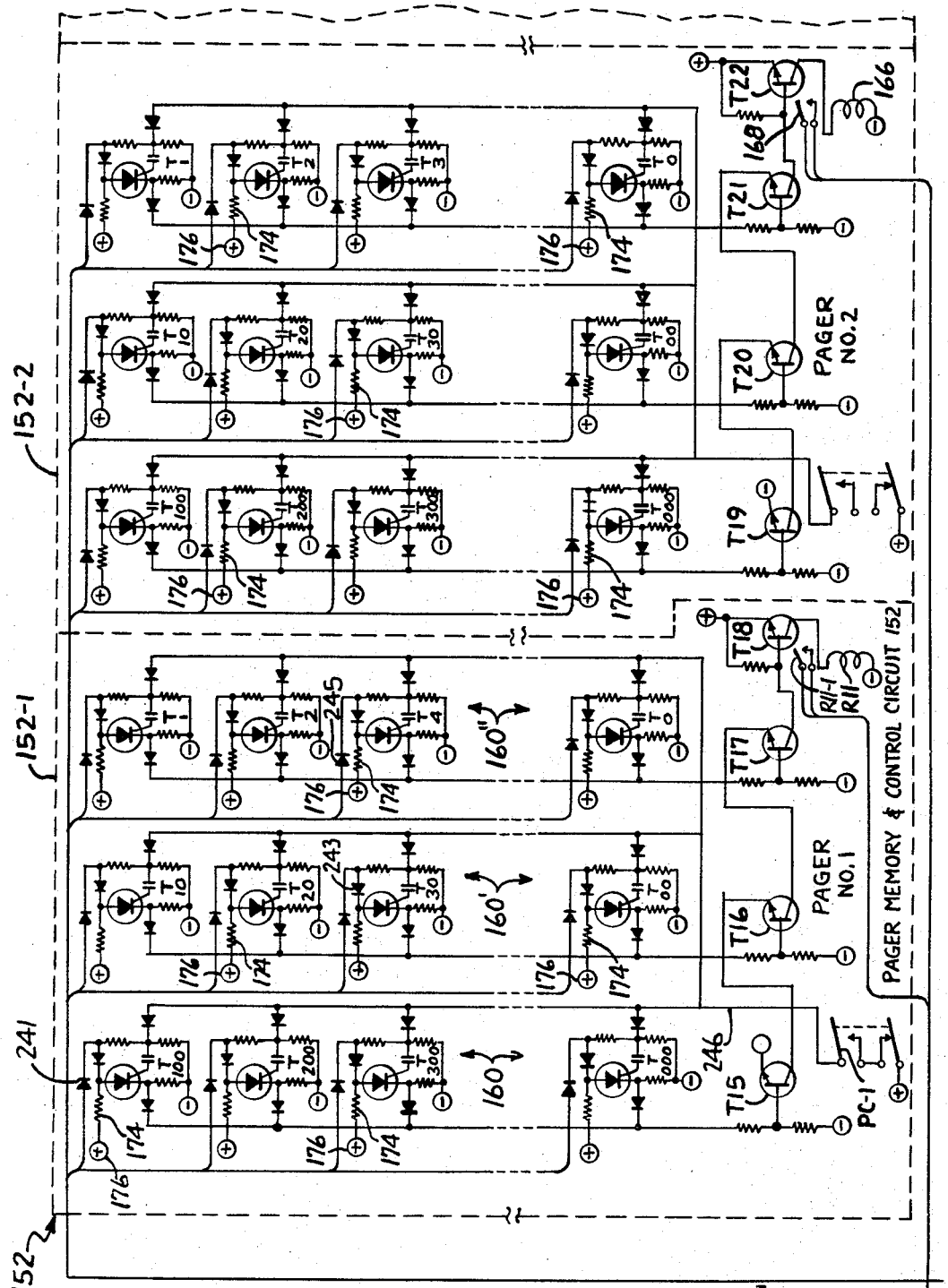

United States Patent Office 3,418,650
Patented Dec. 24, 1968

3,418,650
IN AND OUT REGISTER AND PAGER SYSTEM HAVING INDICATORS AT REMOTE AND CENTRAL STATIONS
Anthony J. Rich, 833 S. Harvard, Villa Park, Ill. 60181, and Algimantus K. Stankevicius, 117 N. 16th Ave., Melrose Park, Ill. 60160
Filed Apr. 26, 1965, Ser. No. 450,625
16 Claims. (Cl. 340—311)

ABSTRACT OF THE DISCLOSURE

A wireless pager system including a multi-channel transmitter capable of transmitting different signals, individual pager receiver units each adopted to receive a different one of the transmitter signals, user check-out identifying means at a pager check-out station and operable by the user for identifying himself, a memory circuit associated with each pager receiver unit, means for storing in each memory circuit information identifying the person who has checked the associated pager receiver out as indicated by the operation of the user check-out identifying means, an operator station including user identifying means which are set by the operator to identify the person to whom a signal is to be transmitted, and means at the operator station for operating the transmitter to generate the signal to be received to the pager receiver unit assigned to the person identified by the operation of the user identifying means at the operator station in accordance with the information stored in said memory circuits.

---

This invention has its most important application to a system for registering doctors in and out of a hospital, so that the switchboard operator and others in the hospital are aware at all times whether or not a given doctor is in the hospital, and for communicating to the doctor in the hospital emergency and other messages. Certain aspects of the invention, however, have utility in other in and out register and pager systems.

Many in and out doctor register and pager systems have been developed in recent years. In most of these systems, a doctors' entrance unit is placed at one or more entrances to the hospital at which the doctors are expected to enter. These doctors' entrance units generally have a dialing unit upon which a doctor entering or leaving the hospital dials a number identifying himself. If the doctor is checking in the hospital, he operates a doctor-in switch which energizes a light mounted on an annunciator panel which indicates that the doctor involved is in the hospital, and the light remains on the panel until he checks out of the hospital by dialing his number and operating a dotcor-out switch. In some of these doctor register systems, when the doctor dials his number upon entering the hospital, if a message is waiting for him a light will flash on the entrance unit indicating the presence of such a message.

In addition to the doctors' register system referred to, some hospitals have installed a doctor's radio communication pager system. Prior to the present invention, these pager systems generally utilized individual miniature pager radio receiver units assigned before hand to the doctors who are staff members of the hospital. Each pager receiver unit is tuned to receive a radio carrier signal of a different frequency. A radio transmitter is provided which is capable of transmitting radio signals of as many different carrier frequencies as there are assigned pager receiver untis. As a doctor enters the hospital, he removes his previously assigned pager receiver unit from a rack, and, upon doing so, he may be automatically registered in the hospital.

When a message comes in for a doctor in the hospital, the operator depresses the frequency selector pushbutton on the transmitter which will effect transmission of a radio signal having the frequency assigned to the particular doctor involved. These signals are generally pulsating tone modulated signals which are readily heard by the doctor carrying the pager receiver unit in his pocket. Some of the pager systems provide for voice communication.

These prior doctor register and radio pager systems left much to be desired, for example, from the standpoint of their flexibility of use under various circumstances. Thus the number of doctors which can be accommodated by the pager portion of these systems is limited by the number of different frequencies which can be transmitted by the transmitter. Such a system is very inefficient because the number of doctors which are present in a hospital at one time may be only a fraction of the total number assigned the pager receiver units, and so a large percentage of the pager receiver units may remain unused even though there are doctors not assigned pager receiver units who could use them.

One of the important features of the present invention relates to an improvement in the paging portion of the doctors' register and pager system. With this improvement, the number of doctors who can be served by the paging system is vastly in excess of the number of pager receiver units used in the system. For example, with only thirty pager receiver units and accompanying transmitter frequencies, a staff of over a hundred doctors normally could be serviced under the condition where not more than 30 doctors are normally present in the hospital at one time. In accordance with this aspect of the invention, the pager receiver units are not assigned to the doctors before hand. When a doctor enters the hospital, he goes to a doctors' entrance unit and operates doctor number selector switches which enter his number into the register system which identifies the fact that he is checking in the hospital. (These doctor number selector switches are preferably digit selector push buttons operated in succession to the digits of the number involved.) He then takes at random a pager receiver unit. The system has a pager memory circuit with an individual memory stage assigned to each pager receiver unit and in which a number or other marker identifying each doctor can be stored. As a doctor takes a pager receiver unit, his number or other marker is stored automatically in the memory stage assigned to the selected pager receiver unit. The number or marker remains in the memory stage until the doctor returns the pager receiver unit to the doctors' entrance unit from which it was taken. This will clear the memory stage involved for assignment to a new doctor who enters the hospital and selects the same pager receiver unit.

To communicate with a doctor having a pager receiver unit, the operator merely operates doctor number selector switches, preferably digit selector push button like those referred to above, which set up the number of the doctor to whom she desires to communicate and operates a transmitter control switch, whereupon the system will respond to the information stored in said pager memory circuit and automatically operate the transmitter to generate the frequency assigned to the receiver pager unit selected by the doctor involved.

In accordance with another aspect of the invention, the selection of a pager receiver unit by a doctor entering the hospital is optional, and the radio paging system described is integrated with a doctor in-out register system, so that the operator will readily know whether or not a particular doctor who has checked in has taken a pager receiver unit. There are many circumstances when the doctor may not check out a pager receiver unit, as, for example, where he plans to be in the hospital for only a short time, or where all of the pager receiver units are already in use when he checks in the hospital. It is noted that in the prior hospital paging systems referred to it was necessary for a doctor entering the hospital to be checked in by the doctor register system to select a pager receiver unit. In the present invention, however, the doctor has the choice of whether or not to take a pager receiver unit, and the system memorizes whether he has checked in with or without a pager receiver unit. Also, the system preferably displays a light or other marker opposite the doctors name on an annuniciator or readout panel when the doctor has checked out a pager receiver unit so that the switchboard operator knows at a glance whether a doctor has checked out a pager receiver unit. If he has, then she can communicate messages to the doctor by means of the radio transmitter system referred to. If the particular doctor is in the hospital but has not taken a pager receiver unit, she would operate a message-in switch which will preferably energize a message indicating light at the point on the readout annunciator panel next to the name of the doctor involved. Thus, a doctor or other person viewing such a readout panel will know whether a message is awaiting a particular doctor. Any person can also determine whether a message is awaiting a particular doctor by going to a doctors' entrance unit and operating the digit selector push buttons thereof to the doctor's number. This interrogates the register system and, if a message is waiting, a message light located at the particular doctors' entrance unit will flash indicating the presence of a message for the doctor.

In accordance with the most preferred form of the invention, there is provided at each doctors' entrance unit as well as at the switchboard operator's station function switches, sometimes referred to as programming push buttons, identified respectively as "Doctor In," "Doctor Out," and "Cancel" push buttons. A doctors' entrance unit may be positioned at a number of entrances or other points in the hospital, although pager receiver units will be available at only the main doctors' entrance. The doctors' entrance units have an additional programming push button which is referred to as a "Doctor-In With Pager" push button.

A digit display window is also preferably provided at each doctors' entrance unit and the switchboard operator's station, and doctor number indicating lights are mounted behind each digit display window for displaying in the window the number set up on the associated digit selector push buttons. The doctor number indicating lights behind the various windows are connected in parallel so that the same number appears behind all of the digit display windows. Thus the person operating the digit selector push buttons can check whether he has pushed the proper push buttons, and the switchboard operator or anyone standing near a doctors' entrance will know that the system is in use (and so will avoid simultaneous operation of the controls of two stations which may cause erroneous operation of the system), and the identity of the doctor checking in or out of the hospital.

Another desirable feature of the invention is that operation of any of the programming push buttons at a doctors' entrance unit will automatically clear the system for a new check in or check out operation and remove the doctor's number from the digit read out windows. This is not so, however, of the programming push buttons of the switchboard operator's station. The "Cancel" push button at a doctors' entrance unit is operated by a doctor when he has read the wrong number into the system and he desires to cancel the same without carrying out a programming function. The switchboard operator clears the system by operation of her "Cancel" push button. The "Dr.-In With Pager" push button is operated when the doctor selects a pager receiver unit. Operation of the "Doctor In" push button at a doctors' entrance unit or switchboard operator's station will energize a doctor-in lamp on the annunciator panel, and operation of the "Dr.-In With Pager" push button at a doctors' entrance unit will energize a pager indicating lamp on the annunciator panel. These lamps remain energized until the doctor involved checks out or the operator checks him out by depressing her "Doctor-Out" push button.

The above described and other advantages and features of the invention will become apparent upon making reference to the specification to follow and the drawings wherein:

FIG. 1 is a simplified block diagram of a basic doctors' register and paging system including features of the present invention;

FIG. 2 is a fragmentary front view of the control panel portion of a doctors' entrance unit forming a part of the system of FIG. 1;

FIG. 3 is a fragmentary front view of the control panel portion of a switchboard unit forming a part of the system of FIG. 1;

FIG. 4 is a fragmentary front view of a readout panel forming a part of the system of FIG. 1;

FIG. 5 is a detailed exemplary block diagram of the doctors' register and paging system shown in FIG. 1;

Figure 8:
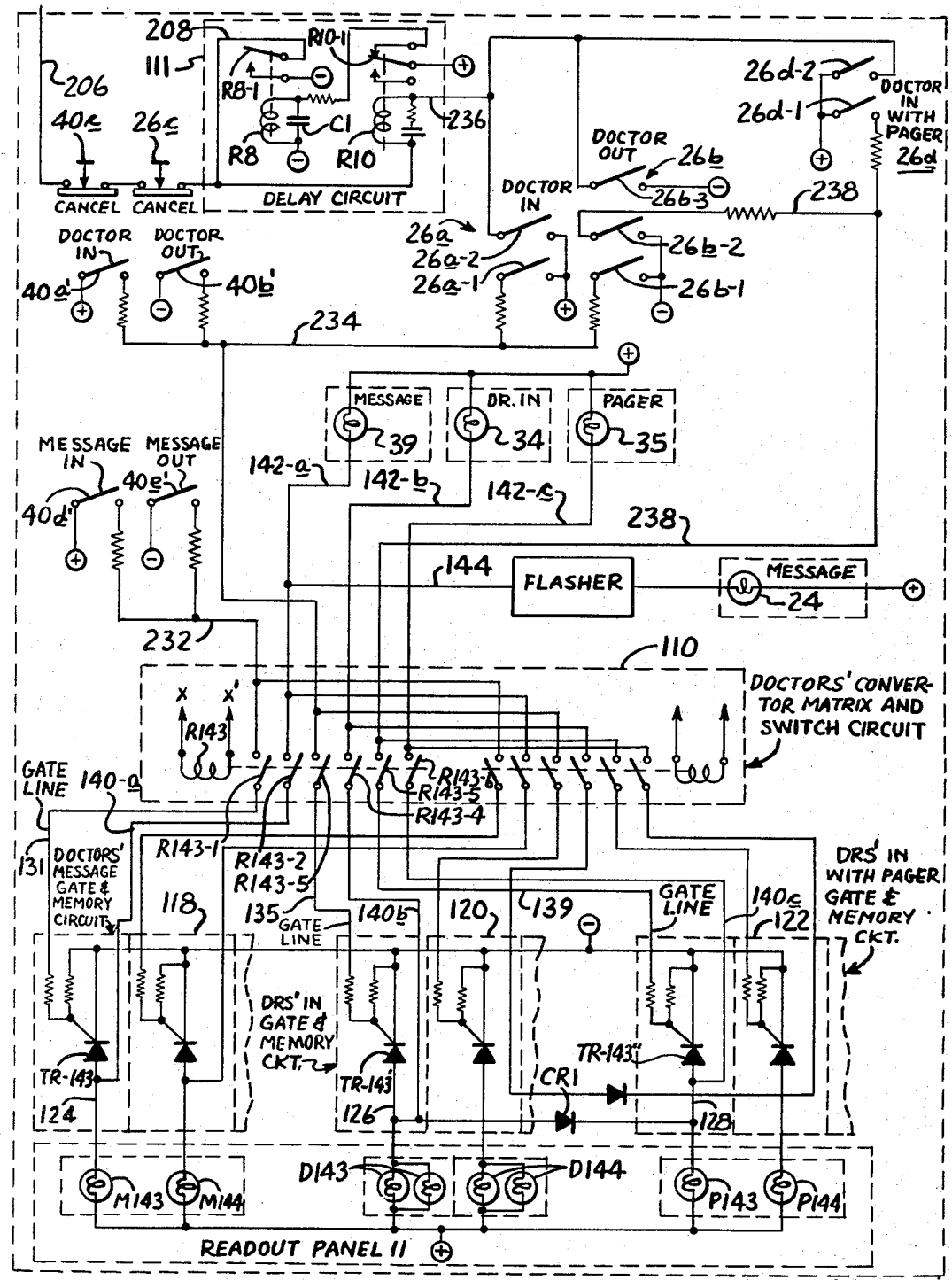

FIGS. 6 through 11 form an exemplary integrated circuit diagram of the doctors' register and paging system shown in block form in FIG. 5; and FIG. 12 is a diagram illustrating the manner in which FIGS. 6 through 11 can be combined to form a single integrated circuit diagram.

*General description*

Refer now to FIGS. 1–4 which illustrates a simplified block diagram of an exemplary doctors' register and pager system of the present invention. At the main entrance to the hospital at which most of the doctors are expected to enter, there is a doctors' entrance register and pager unit 10 and at other entrances where doctors may also enter there may be placed a doctors' entrance register unit 10' which is similar in many respects to the doctors' entrance unit 10. The illustrated doctors' register system also includes a central display panel 11, a switchboard unit 12, a memory and programming unit 13 and a radio transmitter 14.

Each illustrated doctors' entrance unit 10 and 10' has doctors' number selector controls which are preferably a set of ten digit selector buttons 16 for the digits 0 through 9, a three digit readout window 18 with digit forming lamps 18' therebehind which can preferably display the three digits of a number identifying the doctor operating the entrance unit, a message lamp 24 for identifying the presence of a message for the doctors involved, programming push buttons 26 (or other selector) switches and a handset 27. The programming push buttons 26 include push buttons 26a and 26b respectively labeled "Doctor In" and "Doctor Out," and push buttons 26c labeled "Cancel." The doctors' entrance unit 10 has individual pager radio receiver units 29 to be further described (which are not available at the doctors' entrance units 10') and the entrance unit 10 has a "Dr.-In With Pager" push button 26d absent also in each entrance unit 10'.

When a doctor enters the hospital through an entrance having a doctors' unit 10 or 10', he first depresses in succession three digit push buttons 16 representing the hundreds, tens and units digits of the number identifying himself, whereupon a signal is fed to the memory and program unit 13 which, in turn, feeds energizing current to the operator's and doctors' entrance units 10, 10' and 12, to energize lamps 18 behind the doctors' entrance digit readout windows 18, and lamps 30' behind a digit readout window 30 on the switchboard unit 12, to display the number entered on the push button 16 of any of the doctors' entrance unit. In this way, the switchboard operator or anyone confronting a doctors' entrance unit will know whether the system is in use or not and, is so, who is checking in or out at the time involved. If the system is in use by a doctor, no one else should operate the system until the doctor's number appearing on the digit readout windows 18 and 30 disappears.

If there is a message awaiting the doctor involved, the memory and programming unit 13 feeds a signal to the message lamp 24 of all of the doctors' entrance units 10 and 10' which will flash the same, whereupon the doctor who is registering in will pick up handset 27 to communicate with the switchboard operator who will give him the message. The switchboard unit 12 has a chime or other audible device 30 and an intercom window 32 marked IC which is lighted when the handset 27 of a doctors' entrance unit is picked up from its upwardly urged switch operating support 33.

Immediately after depressing the digit selector push buttons 16, the doctor checking in or out also depresses one of the programming push buttons 26 on the doctors' entrance unit, which feeds a reset signal to the memory and programming unit 13 which will de-energize the lamps behind the digit readout windows 18 and 30 and clear the system for use by another doctor. If the "Doctor In" push button 26a or the "Dr. In With Pager" push button 26c is depressed, doctor identifying lamps on the readout panel 11 identifying that the doctor is in will be energized. Where the "Dr. In With Pager" push button 26d is depressed, a doctor in with pager lamp on the panel 11 adjacent the doctor identifying lamps will be energized to identify that the doctor has taken one of the pager receiver units 29.

The readout panel 11, which may be located in the lobby of the hosiptal and/or in some other convenient centralized area of the hospital, contains rows of narrow horizontally elongated backlighted windows 11' one being assigned to each doctor. As illustrated, each window has three sections 11a, 11b and 11c with message, doctor-in and doctor-in with pager indicating lamps mounted behind the respective window sections. The windows have indicia printed thereon, such as M for the left window section 11a, P for the right window section 11c and the doctor's number and name of the doctor assigned to the particular window on the middle window section 11b. The indicia on each window section can be read even when the lamp therebehind is not energized.

When a doctor depresses the "Doctor-In" push buttons 26a or the "Dr. In With Pager" push button 26d, a signal delivered to the memory and programming unit 13 will result in the lighting of the aforesaid doctor-in lamps behind the middle window section 11b assigned to the doctor involved. In a similar way, operation of the "Dr. In With Pager" push button 26d will light a pager lamp behind the associated P window section 11c. The message indicating lamp behind the M window section 11a will light up when there is a message for the particular doctor involved. The message lamp is turned on by a control signal fed to the memory and programming unit 13 from the switchboard unit 12 in a manner to be described.

The switchboard display and control unit 12 has a set of digit selector push buttons 37 for the digits 0 through 9. If the operator cannot see the readout panel 11, although it is preferred that she can see the same, she can find the status of a doctor by depressing the digit selector push buttons 37 in succession to the hundreds, tens and units of the digits number identifying the doctor involved. Signals are then fed to the memory and programming unit 13, and the latter will feed signals to the switchboard and doctors' entrance units 10 and 10' and 12 which will cause the number of the doctor to appear on the digit readout windows 18 and 30 thereof. The programming and memory unit 13 will then also feed signals to the switchboard unit 12 which will light up a lamp behind a "Message" window 39 of the unit 12 if a message is waiting for the doctor, the lamp behind the "Dr.-In" window 34 if the doctor involved has checked in, and the lamp behind a "Pager" window 35 if the doctor has checked in with a pager receiver unit 29.

The switchboard unit 12 also has a number of programming push buttons 40 for carrying out many functions to be described. These push buttons are a "Doctor In" push button 40a, a "Doctor Out" push button 40b, a "Cancel" push button 40c, a "Message In" push button 40d, a "Message Out" push button 40e, a "Pager On" push button 40f, a "Clear For Voice" push button 40g and an "Emergency" push button 40h. Operation of the "Cancel" push button 40c of the switchboard unit will remove the effect of operating the digit selector push buttons 37, such as the number appearing on the digit readout windows 18 and 30, and will otherwise clear the system for use by a doctor checking in or out of the hospital. (As previously indicated, a similar clear operation occurs when a doctor depresses any of the programming push buttons 26a, 26b, 26c or 26d at a doctors' entrance unit 10 or 10'.)

If a doctor is out of the hospital and a message comes in for that particular doctor, the switchboard operator depresses the "Message In" push button 40d, and a signal fed to the memory and programming unit 13 will light the message indicating lamp behind the M window section 11a of the doctor involved. Operation of the switchboard operator's "Message Out" push button 40e will remove the light from M window section 11a involved. The depression of the "Doctor In" or "Doctor Out" push buttons 40a or 40b will check a doctor in or out in the same way as if the doctor operated the "Doctor In" and "Doctor Out" push buttons 26a or 26b at a doctors' entrance unit 10 and 10'.

The memory and programming unit 13 memorizes the doctor in, doctor out, message in, message out, and doctor in with pager conditions for each doctor, as identified by the various light on and off conditions of the window sections 11a, 11b and 11c of the readout panel 11.

The pager receiver units 29 are used to communicate messages by radio to doctors in the hospital. There are a number of pager receiver units and associated transmitters on the market which are useful in the doctor register system now being described. The pager receivers units are pocket sized FM radio receivers tuned to any one of a number of possible frequenciers. If there are thirty pager receiver units, then there will be thirty different carrier requencies respectively assigned to these various units. Each of the illustrated pager receiver units is mounted in a separate compartment 45 of the doctors' entrance unit 10. Upon removal of a pager receiver unit from a compartment, a pulsed signal is fed to the memory and programming unit 13 which will result in the storing of information indicating that the particular pager receiver unit has been selected by the doctor involved identified by the number which appears on the digit readout window 18. As will appear, with this arrangement, it is not necessary to provide a separate pager receiver unit for each doctor in the hospital, which would necessitate a much more expensive paging system. In an averaged sized hospital, there may be normally no more than thirty doctors in the hospital at a time who would need a pager receiver unit.

If the switchboard operator has a message for a doctor in the hospital, she will first operate the digit selector push buttons 37 to set up the number identifying the doctor involved on the digit readout window 30 and she then looks a the "Dr.-In" and the "Pager" windows 34 and 35 to see if the doctor involved is in the hospital and if he has checked out a pager receiver unit as indicated by the lighted conditions of these windows. If these windows are lighted, she depresses the "Pager On" push button 40 if an emergency is not involved, or the "Emergency" push button 40h if an emergency is involved. This feeds an energizing signal to the transmitter 14 which then responds to a signal from the memory and programming unit 13, indicating what pager the doctor identified by the number appearing on the digit readout window 30 has checked out, by energizing the channel of the transmitter which generates a slowly pulsing tone modulated FM carrier frequency assigned to the pager receiver unit involved. The pager receiver unit demodulates the received signal and the tone signal is fed to a small speaker unit (not shown) which generates an audible tone heard by the doctor carrying the pager receiver unit. The duration of the transmitted signal can be a fixed duration of several seconds determined internally by the transmitter or it can be determined by the length of time the "Pager On" push button 40f is depressed. Instead of depressing the "Pager On" push button 40f, the switchboard operator may depress an "Emergency" push button 40h which will cause the transmitter to modulate the carrier with a rapidly pulsating tone signal which the doctor understands indicates that an emergency situation is present requiring his immediate attention.

When the doctor hears a tone signal in his receiver unit, he may go to a telephone or doctors' entrance unit and communicate with the switchboard operator. In the system illustrated in the drawings, the switchboard operator can communicate by radio voice communication to the doctor. For this purpose, a microphone 49 and a "Clear For Voice" push button 40g are provided on the switchboard 12. After the switchboard operator has completed her radio message, she depresses the "Cancel" push button 40C to clear the doctor's number from all the readout windows 18 and 30 so a doctor can check in or out, or a new communication operation can be carried out.

*Detailed block diagram of FIG. 5*

In the preferred form of the invention, each of the digit selector push buttons has three sets of switches with separate lines extending therefrom to a doctor's digit number register 102. The thirty lines thus extending from the switches of each set of digit selector push buttons 16 and 37 are identified respectively by reference numbers 100 and 100'. This regitser 102 may comprise three sets of ten relays or other switch elements representing the hundreds, tens and units digits of three digit numbers identifying doctors assigned, for example, numbers 100 through 199. (It should be noted that the various windows 11' of the readout panel 11 are correspondingly numbered 100 through 199. The system being illustrated could be expanded by adding additional readout panels which would contain doctor numbers 0 through 99, 200 through 299, etc. The hundreds digit would, in effect, identify the particular readout panel 11 and the doctors assigned to that panel.) When a doctor depresses digit selector push buttons 16, the digits assigned to the push buttons depressed will be set up in the doctor's digit number register by operating or energizing the corresponding relays or other switch elements in the hundreds, tens and unit sections of the register 102.

In the illustrated embodiment of the invention, the various relay contacts or other switch elements constituting the hundreds, tens and units sections of the doctors' digit number register 102 are connected through a suitable diode network 104 which controls the various lamps 30' and 18' which set up the proper pattern of lights behind the digit readout windows 30 and 18 of the switchboard unit 12 and the doctors' entrance units 10 and 10' to correspond to the hundreds, tens and units digits set up in the register 102. To this end, a series of conductors collectively identified by reference numeral 106 extends between the diode network 104 and the switchboard unit 12. Similarly a group of conductors collectively identified by reference numeral 108 extends between the diode network 104 and the doctors' entrance units 10 and 10'.

The doctor's digit number register 102 can be reset or cleared in a number of ways. It can be reset by a circuit including a cancel line 113 extending to a switch operated by the "Cancel" push button 40c of the switchboard unit 12. In the preferred form of the invention, where the circuit 102 is a relay circuit, the latter switch is connected by a line 115 in series with similar switches operated by the "Cancel" push button 26c of each of the doctors' entrance units 10 and 10'. All of these switches are normally closed and form part of holding circuits of the relays of the register 102, so that operation of any of the "Cancel" push buttons will open the holding circuits of the register relays.

The doctors' digit number register 102 can also be reset from a doctors' entrance unit by the depression of the "Doctor In" push button 26a, the "Doctor Out" push button 26b, or the "Dr.-In With Pager" push button 26d. These push buttons operate contacts which generate a reset signal on a reset line 109 extending to a delay means 11 which delays the effect of this signal until the function to be performed by the push button switch involved has been carried out. Where the register 102 is a relay circuit, the delay means 11 can be a relay with a capacitor connected thereacross to delay the operation of the relay. The reset signal on the line 109 referred to operates the delay relay which subsequently opens normally closed contacts of the delay relay in the holding circuits of the register relays.

For convenience, the relays or other switch elements of the doctor's digit number register 102 which are operated at any given time energize a single relay or other switch element in a doctors' converter matrix and switch circuit 110 exclusively assigned to the particular number involved. Thus, the twenty tens and units relays or switch elements of the register 102 are connected by a matrix circuit to one hundred relays or other switch elements in the circuit 110. Where relays are used, each relay of the circuit 110 has as many as six sets of contacts for directing signals generated by manually operated switches used in common for all the doctors (such as the programming push button operated switches 26 and 40) to memory elements associated only with the number set up in the doctor's digit number register. The switch elements or relay contacts of the circuit 110 control corresponding memory elements in a message gate and memory circuit 118, a doctor-in gate and memory circuit 120 and a doctor pager gate and memory circuit 122.

The message gate and memory circuit 118, may, for example, comprise one hundred transwitches or similar thyraton-type solid state or gaseous discharge devices which are respectively prepared for operation by the one hundred relays or other switch elements of the doctors' converter matrix and switch circuit 110, and the memory elements are fired or otherwise operated by gating voltages fed thereto through circuits established by the relay contacts or other switch elements of the doctors' converter matrix and switch circuit 110. The doctor-in gate and memory circuit 120 and the doctor pager gate and memory circuit 122 are substantially identical to the message gate and memory circuit 118 and, accordingly, may each comprise one hundred memory units. Each of the memory units of the message gate and memory circuit 118 controls a different lamp mounted behind one of the M window sections 11a on the readout panel 11. Each of the memory units of the doctor-in gate and memory circuit 120 controls a different lamp or group of lamps mounted behind one of the central window sections 11a of the readout panel 11 and each of the memory units of the pager gate and memory circuit 112 controls a different lamp behind one of the P window sections 11c of the readout panel 11.

The means for controlling the firing or setting, and the extinguishing or resetting, of the memory units in the message gate and memory circuit 118 include a message line 130 associated with the "Message In" and "Message Out" push buttons 40d and 40e. When the push button 40d is depressed, a memory unit setting signal appears on the line 130, and when the push button 40e is depressed a memory unit resetting signal appears on the line 130. The message line 130 is connected by the relay contacts or other switches of the doctors' converter matrix and switch circuit 110 to the memory unit of the circuit 118 associated with the number set up in the doctors' digit number register 102 by one of a group of conductors collectively identified by a reference numeral 131. Thus, when a memory unit operating signal appears on the line 130, the memory unit associated with the number set up in the doctor's digit number register 102 will be fired, and, when a resetting signal is present on the line 130, the memory unit associated with the number set up in the doctor's digit number register 102 will be reset.

The memory units of the doctor-in gate and memory circuit 120 and the doctor pager gate and memory circuit 122 are operated and reset in a similar manner to the memory units of the circuit 118. Thus, a doctor in-out line 134 is associated with the switches operated by the "Doctor In" and "Doctor Out" push buttons 40a and 40b of the switchboard unit 12, which switches produce a memory unit setting signal on the line 134 when the "Doctor In" push button 40a is depressed and a memory unit resetting signal in the line 134 when the "Doctor Out" push button 40b is depressed. The line 134 is connected with doctor in-out lines 132 associated with the "Doctor In" and "Doctor Out" push buttons 26a and 26b of the doctors' entrance units 10 and 10' which produce the same signals on the lines 132 as the push buttons 40a and 40b produce on the line 134. The lines 132 and 134 are connected through the various relay contacts or other switches of the doctors' converter matrix and switch circuit 110 to conductors 135 extending to the doctor in gate and memory circuit 120. The circuit 110 thus directs the signals on the lines 132 and 134 to the conductor 135 extending to the memory unit of the circuit 120 identified with the number set up in the doctor's digit number register 102. Thus, the presence of a memory unit setting or resetting signal on the line 132 or 134 will set or reset the memory unit of the circuit 120 signal on the line associated with the number set up in the register 102.

The memory units of the doctor pager gate and a memory circuit 122 are controlled by signals on a doctor in with pager line 137 associated with the "Dr. In With Pager" push button 26d. When the "Dr. In With Pager" push button 26d is depressed, a memory unit setting signal appears on the line 137. Operation of the "Doctor Out" push button 26b at any Doctors' entrance unit will, in addition to the signals previously generated, generates a memory unit resetting signal which appears on the line 137. The line 137 and the setting and resetting signals thereon are coupled through relay contacts or other switches of the doctors' converter matrix and switch circuit 110 to one of a number of conductors 139 extending to the memory unit identified with the number set up in the doctor's digit number register 102 to set and reset the memory unit.

The relay contacts or switch elements of the doctors' converter matrix and switch circuit 110 connect the various lamps mounted behind the "Message," "Dr. In" and "Pager" windows 39, 34 and 35 of the switchboard unit 12 respectively in parallel with the lamps behind the window sections 11a, 11b and 11c of the doctor identified by the number set up in the doctor's digit number register 102. To this end, conductors collectively identified by reference numeral 140 extend from the lamps mounted behind the readout panel 11 through respective contacts or switches of the relays or other switch elements of the circuit 110, output terminals M, D and P and three conductors collectively identified by reference numeral 142 to the various lamps mounted behind the windows 39, 34 and 35. The output terminal M associated with the conductors 140 extending to the lamps mounted behind the various M window sections 11a of the readout panel 11 is connected by a conductor 144 to a flasher unit 146 in turn connected to the message lamps 24 of the doctors' entrance units 10 and 10'. Thus, when the message lamp mounted behind the window section 11a assigned to a doctor whose number is set up in the register 102 is energized, the voltage across this lamp will be coupled by the conductor 144 to the flasher unit 146, which can be a heat responsive switch element which opens and closes as it heats up and cools off, to feed a slowly pulsating voltage to the message lamps 24 to flash the same.

A pager memory and control circuit 152 is provided which includes a number of individual memory circuits 152–1, 152–2, etc. each of which is associated with a different one of the pager receiver units 29 at the doctors' entrance unit 10. Accordingly, a memory operating line 154–1, 154–2, etc. extends from a switch (not shown in FIG. 5) associated with each pager receiver unit 29. When a doctor removes a pager receiver unit from a compartment 45, a spring urged switch control arm 158 extending into the associated compartment and held depressed by the presence of the unit will be released. The control arm 158 may control a make-before-break switch which will generate a pulse of a given polarity only during the time when the arm moves from a depressed to a released state and when the arm moves from a released to a depressed state when the pager receiver unit is returned to the compartment. Thus, when a switch operating arm 158 is released, a memory circuit setting signal is fed on the associated memory operating line 154–1 or 154–2 etc. extending to the memory circuit assigned to the pager receiver unit involved.

In the most preferred form of the invention, each memory circuit preferably includes three sets of ten SCR (silicon control rectifier) or equivalent memory devices, the three sets of devices being respectively identified by reference numerals 160, 160' and 160". The ten memory devices in each set 160, 160' and 160" respectively represent the various possible hundreds, tens and units of the numbers which can be set up in the doctor's digit number register 102. Accordingly, sets of conductors 161, 161' and 161" extend from the corresponding digit switches or relay contacts of the hundreds, tens and units sections of the doctor's digit number register 102 respectively to the corresponding memory devices in all of the pager memory circuits 152–1, 152–2, etc. so that, when a particular relay or switch in the doctor's digit number register is operated, the corresponding memory devices in all of the memory circuits is prepared for operation, that is prepared for firing if the memory device is an SCR device, when a memory circuit setting pulse is fed to the gate terminals thereof from the associated memory operation lines 154–1 or 154–2, etc. Each memory operation line is connected to the gate terminals of all of the SCR devices of the associated memory circuit. It is thus apparent that the proper sequence in checking out a pager receiver unit is to first operate the digit selector push buttons 16 to set up the correct doctor's identifying number in the doctor's digit number register 102. following which a pager receiver unit is first removed from a compartment 45 and the "Dr. In With Pager" push button 26d is then depressed which clears the doctor's digit number register 102. Otherwise, the SCR devices involved will not be prepared for conduction when the pager receiver unit is removed from the compartment 45.

Each pager memory circuit 152–1, 152–2, etc. has conduction sensor circuit 164, 164' and 164" respectively associated with the associated three sets of SCR devices 160, 160' and 160". Each of these conduction sensor circuits will be in a conduction indicating state if any one of the SCR devices of the associated set has been fired into a highly (as distinguished from a low) conductive state. If the conduction sensor device 164 associated with the hundreds digit of the number set up in the doctor's digit number register unit 102 senses the high conduction of an associated SCR devices, it will prepare the next conductor sensor circuit 164' associated with the next set 160' of SCR devices for the sensing of a high conduction of any SCR thereof. In a similar way, if the conduction sensor circuit 164' senses a high conduction of one of the SCR devices in the set 160' it will prepare the next conduction sensor circuit 164" for the sensing of a high conduction of one of the SCR devices of the set 160".

If all three conduction sensor circuits 164, 164' and 164" detect the presence of a highly conductive SCR device, a relay 166 will be energized to close a set of contacts 168. The contacts 168 associated with the various memory circuits 152-1, 152-2, etc. are respectively connected by conductors 170-1, 170-2, etc. to the transmitter 14. The transmitter 14 will be thereby prepared to transmit a signal of the frequency determined by the line 170-1, 170-2, etc. connected to a closed set of current relay contacts 168 and the transmitter will transmit a signal of this frequency when the operator depresses the "Pager On" or "Emergency" push buttons 40f, 40g or 40h. To this end, pager-on and emergency lines 171 and 173 respectively extend from the switches controlled by the push buttons 40f and 40h to the transmitter 14.

A transmitter which is very well suited to the exemplary form of the present invention is Model No. CP 122 manufactured by Teletracer International Incorporated of New York. This transmitter 14 has manually operable switches (not shown) for closing switches to prepare the transmitter for transmitting the selected frequency. The contacts 168 operate to close the same circuits which would be closed by the various transmitter switches, and so each set of contacts 168 extends to a different circuit (or group of circuits) in the transmitter.

The first closure of a set of contacts 168 when the doctor first enters the hospital and selects a pager receiver unit will have no effect because the closing of the contacts 168 ends with the clearing of the doctor's identifying number from the doctor's digit number register 102, by the operation of the "Dr. In With Pager" push button 26d. When the register 102 is so cleared, the SCR fire preparing signals appearing on the lines 161, 161' and 161" extending to the various memory circuits will disappear. However, conduction of the fired SCR devices in the various memory circuits will be maintained but at a much lower level of conduction, due to the feeding of energizing voltage from terminals 174 through current limiting resistors 176. The voltage on terminals 174 cannot start the conduction of an SCR device but it can maintain a lower conduction thereof once it is fired. The conduction sensor circuits 164, 164' and 164" are not sufficiently sensitive to detect the lower level of conduction of the SCR devices and thus the associated relay 166 will remain de-energized under these conditions.

If a switchboard operator should subsequently operate the digit selector push buttons 37 to set up a doctor's identifying number in the doctor's digit number register 102, this will again result in the feeding of signals on the lines 161, 161' and 161" which again cause high conduction of all the previously low conducting SCR devices of the pager memory circuit having conducting SCR devices representing the same combination of digits as the number in the doctor's digit number register 102. Only one memory circuit normally can have three such highly conducting SCR devices. It is thus apparent that only the relay 166 of the memory circuit associated with the pager receiver unit checked out by the doctor involved can be re-energized to close the contacts 168. As previously indicated, this will result automatically in the transmission by the transmitter 14 of the proper frequency when the switchboard operator depresses the "Pager On" push button 40f or "Emergency" push button 40h.

As previously indicated, the switchboard operator can communicate by voice with the selected doctor by holding the "Clear For Voice" push button 40g down and talking into the microphone 49. FIG. 2 shows a clear for voice line 180 which connects a switch operated by the "Clear For Voice" push button 40g to the transmitter 14. A line 182 connects the microphone 49 to the voice modulator portion of the transmitter 14.

It will be recalled that the operation of the programming switches 40 on the switchboard unit 12 other than the "Clear" push button will not clear the doctor's digit number register 102. Only operation of the "Cancel" push button 40c can accomplish this result. Consequently, the switchboard operator can operate the "Pager" push button 40f, the "Clear For Voice" push button 40g and the "Emergency" push button 40h without losing contact with the doctor involved, since the doctor's digit number register will not be cleared of the doctor identifying number set up therein by such operation.

When the doctor checks out of the hopsital he will first return the pager receiver unit to the correspondingly numbered compartment 45. Under these circumstances, a memory circuit operating positive pulse appears on the associated memory circuit line 154-1, 154-2, etc. which, because of the peculiarity of the pager memory circuits will extinguish all of the then conducting SCR devices in the associated pager memory circuit 152-1, 152-2, etc. to be described in detail. Suffice it to say at this point, when an SCR device is in a low conducting state, the gate or control terminal thereof has control over the conduction of the SCR device and the anode voltage is lower than the magnitude of the positive pulse fed to the control terminal thereof. Under the circumstances, the positive control pulse acts as a conduction stopping pulse. When the SCR device is non-conductive, however, a positive pulse fed to the control terminal thereof acts as a firing voltage because, then, the anode voltage is higher than the control voltage.

*Doctor's digit number register, digit selector push buttons, digit readout lamps and diode network*

The doctor's digit number register 102 may consist of three banks of ten 4-pole relays R1 to R10, R1' to R10' and R1" to R10" (FIG. 7) and three 1-pole, double throw current relays R5, R6 and R7 (FIG. 6) for the hundreds, tens, and units digits of the doctors' numbers. For purposes of illustration it will be assumed that doctor's number 143 is selected. (Obviously, any three digit numbers other than 000 can be selected and the circuit will operate in a similar way with other relays coming into play.) In the explanation to follow, the contacts of the relays are identified by using the basic reference character (such as R1) followed by a number and sometimes an alphabet character which identifies the particular set of contacts or contact of the relay involved.

When the digit push button 16 in FIG. 6 is depressed, the coil of the digit register relay R1 in FIG. 7 is energized by completing the circuit through the conductor 202, push button contacts 16-1 in FIG. 6, conductor 204 and the contacts R5-1a and R5-1b to a positive voltage source. The negative voltage source to the coil of the digit register relay R1 in FIG. 7 is supplied through the conductor 206, the normally closed contacts of the cancel push button switches 40c and 26c in FIG. 8, through conductor 208, and the contacts R8-1 of the delay relay. (Note the coil of relay R8 is normally in an energized state and the negative voltage source of all the digit register relay is through the contacts R8-1.)

As the contacts R1-1 in FIG. 7 are closed, it switches the coils of relays R1 and R5 in FIG. 6 in series through the conductor 210. The coil of relay R5 is energized and the contacts R1-1 and R5-1c and R5-1c are held closed. The closing of the contacts R5-1a and R5-1c in FIG. 6 prepare the second bank of ten digit register relays for registering the second digit of the doctor's number.

As the digit 4 push button 16 in FIG. 6 is depressed, the coil of the digit register relay R4' in FIG. 7 is energized by completing the circuit through the conductor 212, push button contacts 16-4' in FIG. 6, conductor 214, the contacts R6-1a, R6-1b, R5-1a and R5-1c to a positive voltage source. As the contacts R4'-1 in FIG. 7 close, they switch the coils of relays R4', and R6 in FIG. 6 in series through the conductor 216. The coil of relay R6 is energized and the contacts R4'–1 and R6–1a and R6–1c are held closed. The closing of the contacts R6–1a and R6–1c in FIG. 6 prepare the third bank of ten digit register for registering the third digit of the doctor's number.

When the digit 3 push button 16 in FIG. 6 is depressed, the coil of the digit register relay R3" in FIG. 7 is energized by completing the circuit through the conductor 218, push button contacts 16–3" in FIG. 6, conductor 220, the contacts R7–1b, R7–1a, R6–1a, R6–1c, R5–1a and R5–1c to a positive voltage source. As the contacts R3"–1 in FIG. 7 close, they switch the coils of relays R3" and R7 in FIG. 6 in series through the conductor 222. The coil of relay R7 is energized and the contacts R7–1a and R7–1b are held open while the contacts R3"–1 are held closed. The opening of the contacts R7–1a and R7–1b remove the positive voltage source from the digit selector push buttons 16. If an error is made in selecting the doctor's number, the cancel push button 40c or 26c can be depressed to remove the negative voltage source of the digit register relays and cancel the selected numbers.

When the doctor's number 143 has been selected, and the associated digit register relays R1, R4' and F3" in FIG. 7 are energized, the contacts R1–2, R4'–2, and R3"–2 in conjunction with the conductors 224, 226 and 228 and the associated diodes network in FIG. 7, perform the function of illuminating the doctor's number 143 on digital readout lamp 18' and 30' (FIG. 2) mounted behind an apertured mask, such as 18".

When the "Doctor In" push button 26a or "Doctor Out" push button 26b is depressed, it energizes the coil of a relay R10 in FIG. 8 (forming part of the delay means 111 in FIG. 5) through the conductor 236 and contacts 26a–2 or 26b–3 of the push buttons 26a or 26b to a positive voltage source. The negative voltage source is connected through contacts R8–1 of a delay relay R8 and the conductor 208. The coil of relay R10 is energized and the contacts R10–1 thereof open to remove the positive voltage source to the delay relay R8. The capacitor C1 across the coil of delay relay R8 discharges through the coil and holds the relay energized for approximately two seconds after the source has been removed. When the capacitor across the coil of the delay relay R8 has discharged enough to de-energize the relay R8 and opens the contacts R8–1 thereof, the voltage source will be removed from the digit register relays in FIG. 7 and this resets the system for the next doctor.

*Doctors' converter matrix and switch circuit 110 and doctors' gate and memory circuits 118, 120 and 122*

The doctor's converter matrix and switch circuit 110 in FIG. 8 may consist of a 6-pole relay like R143 for each doctor's name on the readout panel. The coils of the doctors' relays in FIG. 8 are connected in a matrix configuration to contacts on the digit register relays in FIG. 7 where the doctor's number 143 has been selected and the associated digit register relays R1, R4' and R3" in FIG. 7 are energized. Contacts R1–4 connect a negative voltage terminal 147 of a voltage source through conductor 230 and the contacts R4'–4 to one of the terminals X of the coil of the doctor's relay R143 in FIG. 8. Contacts R3"–4 connect positive terminal 149 of the voltage source to the other terminals X' of the relay R143.

The contacts R143–1 connects the "Message In" push button switch 40d' and "Message Out" push button switch 40e (FIG. 8) through the conductor 232 to the gate line 131 of the electronic switch TRI in the doctor's message gate and memory circuit 118. (Note the electronic switch could be a device, such as a transistor transwitch, which will conduct when a positive voltage is applied to its gate while the cathode is connected to a negative source and the anode is connected to a positive source through a load of some type, and will be rendered non-conductive when a negative pulse if fed to the gate.) The message lamp M143 associated with the doctor 143 on the readout panel 11 is connected to the anode transwitch of TR143 through the conductor 124. As the "Message In" push button 40d is depressed, it applies a positive voltage source to the gate of the transwitch TR143, causing it to conduct and illuminate the message lamp M143 in FIG. 8. Depressing the "Message Out" push button 40e applies a negative voltage to the gate of transwitch TR143 causing it to stop conducting and consequently turn the lamp M143 off.

The contacts R143–3 connect the "Doctor In" push button contacts 40a' and "Doctor Out" push button contacts 40b' of the operator's unit 12, and the "Doctor In" push button contacts 26a–1 and 26b–1 of the "Doctor In" push button 26a and the "Doctor Out" push button 26b of the entrance unit through the conductor 234, to the gate line 135 of the transwitch TR143' in the doctor-in gate and memory circuit 120.

Doctor identifying lamps D143 in FIG. 8 associated with doctor 143 on the readout panel 11 is connected to the anode of the transwitch T143' through conductor 126. As the "Doctor In" push button 40a or 26a is depressed, it applies a positive voltage to the gate of transwitch TR143', causing it to conduct and illuminate the doctor identifying lamp D143. Depressing the "Doctor Out" push button 40b or 26b applies a negative voltage to the gate of transwitch TR143', causing it to stop conducting, which turns the lamps D143' off.

Assuming the doctor's number 143 is registered in the digit register relays in FIG. 7, the doctor could depress the "Dr. In With Pager" push button 26d and illuminate a pager lamp P143 and the doctor's identifying lamp D143 in FIG. 8 by applying a positive voltage source to the gate of transwitch TR143 through the contacts 26d–1 of push button 26d, conductor 238, contacts R143–5 and the gate line 139. The doctor identifying lamp D143 is connected to the anode of a transwitch TR143" through a diode CRI and the pager lamp P143 connects thereto through conductor 128.

Depressing the "Doctor Out" push button 26b would apply a negative voltage source through contacts 26b–2 of push button 26b, conductor 238, contacts R143–5 of the doctor's relay R9, and the gate line 139 to turn the transwitch TR143" off. When the "Dr. In With Pager" push button 26d or "Doctor Out" push button 26b depressed, the contacts 26d–2 and 26b–3 thereof activate the delay control relay to reset the system.

*Operator programming lamps 34, 35 and 39*

The contacts of the doctor's relay R143 in FIG. 8 parallel the associated message lamp M143 with the "Message" indicator lamp 24 and "Message" indicator lamp 39 through the conductors 140a, 142a and 144. The contacts R143–4 of the doctor's relay R143 parallel the doctor's identifying lamp D143 with the "Dr. In" indicator lamp 34 through the conductors 140b and 142b. The contacts R143–6 of the doctor's relay R143 parallel the pager lamp P143 with the "Pager" lamp 35, through the conductors 140c and 142c.

*Pager memory and control circuit 152 (FIG. 10)*

Each pager memory control circuit 152–1, 152–2, etc. associated with a pager receiver unit in FIG. 10 is made up of three sets or banks 160, 160' and 160" of ten SCR devices T100, T200, etc.; T10, T20, Etc.; T1, T2, etc. The respectively connected anodes thereof are connected to a source of energizing voltage through contacts of the corresponding digit register relays R1, R1', R1", R2, R2', R2", etc. (FIG. 7). In each bank of ten SCR devices, there is a transistor T15, T16 or T17 which is used as a conduction sensor. The emitter-collector electrodes of these transistors are connected in series and they control a memory unit such as a relay R143 or solid state switch. There is one such memory unit for each pager receiver unit. The SCR devices memorize the number of the doctor who takes the pager receiver unit assigned to the memory circuit involved. When a doctor's number is selected and the corresponding digit relays of the doctor's digit number register 102 are energized, a memory relay may energize to set up a code in the transmitter for the pager that the doctor selected.

As illustrated in the drawings, the doctor's number 143 has been selected and the digit register relays R1, R4', and R3" are energized. The contacts R1–3 of digit register relay R1 applies a positive voltage to the anodes of the SCR devices T100 in all the pager memory circuits 152–1, 152–2 etc. through the conductor 240 and diodes 241. The contacts R4'–3 apply a positive voltage to the anodes of the SCR devices T40 in all the pager memory circuits through the conductor 242 and diodes 243. The contacts R3"–3 applies a positive voltage to the anodes of the SCR device T3 in all the pager memory circuits through the conductor 244 and diodes 245.

The SCR devices T100, T40, and T3 in all the pager memory circuits are set up to memorize the doctor's number 143. As the doctor removes a pager receiver unit 29, for example, pager receiver No. 1, he activates make-before-break contacts PC1 and applies a positive voltage pulse to the gate of the pager memory circuit 152–1 through conductor 246. The SCR devices T100, T40, and T3 in pager memory circuit 152–1 fire, and the SCR device T100 biases conduction sensor transistor T15 into conduction, while SCR device T40 biases conduction sensor transistor T16 into conduction, and SCR device T3 biases conduction sensor transistor T17 into conduction. The conducting transistors T15, T16, T17, in turn bias a transistor T18 into conduction and the memory relay 166 in the emitter collector circuit of transistor T18 becomes energized.

When the system is reset for the next doctor, the SCR devices T100, T40 and T3 of the pager memory circuit 152–1 become disconnected to positive voltage through the doctor's digit register, but they are maintained at a low conduction level through an alternate path including voltage dropping anode resistors 176 connected to positive voltage terminals 174. The low conduction condition of the SCR devices T100, T40 and T3 do not bias the conduction sensor transistors T15, T16, and T17 into conduction and the associated memory relay 166 is not energized.

When the pager memory circuit 152–1 has memorized the doctor's number 143, anytime this number is set up in the doctor's digit number register, the low conducting SCR devices having the corresponding digits go into full conduction and bias the associated conduction sensor transistors T15, T16, T17, and T18 into conduction and energize the memory relay 166 where its contacts 168 feed a preparing signal to one of the transmitter inputs.

To extinguish completely the SCR devices of a memory circuit, the pager receiver unit associated with the circuit must be inserted into the storage rack 45 while the SCR devices are conducting at the lower level. At this time, the positive pulse coupled through contacts PCL and conductor 246 to the gates of the SCR devices is greater than the anode voltage and therefore causes the SCR devices involved to stop conducting.

The contacts 168 of each memory relay 166 connect into a different input to the transmitter to select the code necessary to prepare the channel of the transmitter which generates the required tone modulated carrier frequency upon depression of the "Pager On" push button 40f of "Emergency" push button 40h. The operator can also communicate by voice with a doctor by depressing the "Clear for Voice" push button 40g and speaking into the microphone 49, as previously explained. After each message, the operator depresses the cancel push button 40c to reset the system for the next doctor.

The handsets 27 and 27' provide direct communications between the operator's unit 12 and doctors' entrance unit 10 or 10'. As the handset 27 is removed from its support, a switch 33' (FIG. 9) closes and illuminates the IC 30 thereat so the operator will lift her handset 27' from its support and operate contacts 33" to close a circuit which supplies a positive voltage source to an audio amplifier 302. The operator can now give the doctor his message.

While for purposes of illustration one form of this invention has been disclosed, other forms thereof may become apparent to those skilled in the art upon reference to this disclosure and, therefore, this invention is to be limited only by the scope of the appended claims.

We claim:

1. In a wireless pager system including a multi-channel transmitter capable of transmitting different signals, individual pager receiver units each adapted to receive a different one of the transmitter signals, and a pager receiver unit check-out station where individual pager receiver units can be checked out by persons desiring to use the same; the improvement comprising: user check-out identifying means at the check-out station and operable by the user for identifying himself at the time he removes a pager receiver unit from the station; a memory circuit associated with each pager receiver unit; means for storing in each memory circuit information identifying the person who has checked the associated pager receiver out as indicated by the operation of the user check-out identifying means; an operator station for controlling said transmitter, said operator station including user identifying means which are set by the operator to identify the person to whom a signal is to be transmitted; and means at said operator station for operating the transmitter to generate the signal to be received to the pager receiver unit assigned to the person identified by the operation of the user identifying means at the operator station in accordance with the information stored in said memory circuits.

2. In a wireless pager system including a multi-channel transmitter for transmitting different individual pager receiver units each adapted to receive a different one of said signals transmitted by the transmitter, a pager unit check-out station where individual pager receiver units can be checked out by persons desiring to use the same, and an operators station including a transmitter operating control and a second control for identifying a person with whom the operator desires to communicate, the improvement comprising: user check-out identifying means at the check-out station operable by the user for identifying himself at the time he removes a pager receiver unit from the check-out station; a memory circuit associated with each pager receiver unit, each memory circuit including storage means for storing information on the identity of the person checking out the associated pager receiver unit, and means responsive to said user checking-out identifying means at the check-out station for storing information in said storage means on the identity of the person checking out the associated pager receiver unit when the pager receiver unit is removed from the check-out station and for automatically removing said information in said storage means when the pager receiver is returned to said check-out station to clear the memory circuit for information on a new person checking out the same; and means responsive to said memory circuits and the operation of said transmitter operating control for operating said transmitter to transmit the signal which can be received by the pager receiver unit checked out by the person identified by the operation of said second control.

3. In a wireless pager system including a multi-channel transmitter having individual inputs, each of which, upon receiving a control signal, prepares the transmitter for transmitting a different signal when the transmitter is operated, individual pager receiver units each adapted to receive a different one of said signals transmitted by the transmitter, a pager unit check-out station where individual pager receiver units can be checked out by persons desiring to use the same, and an operator's station including a transmitter operating control and a second control for identifying a person with whom the operator desires to communicate, the improvement comprising: pager receiver unit check-out sensing means for each pager receiver unit for sensing the removal of the pager receiver unit from the check-out station and the return thereof to the check-out station; user check-out identifying means at the check-out station operable by the user for identifying himself at the time he removes a pager receiver unit from the check-out station; a memory circuit associated with each pager receiver unit, each memory circuit including storage means for storing information on the identity of the person checking out the associated pager receiver unit, and means responsive to said pager receiver unit sensing means and said user checking-out identifying means at the check-out station for storing information in said storage means on the identity of the person checking out the associated pager receiver unit when the pager receiver unit is removed from the check-out station and for automatically removing said information in said storage means when the pager receiver unit is returned to said check-out station to clear the memory circuit for information on a new person checking-out the same; and means responsive to said memory circuits and the operation of said transmitter operating controls for directing a control signal to the transmitter input which operates said transmitter to transmit the signal which can be received by the pager receiver unit checked-out by the person identified by the operator of said second control.

4. In a system for checking personnel into and out of an establishment and for enabling an operator to communicate to a person who has checked in, the system including: a multi-channel wireless transmitter capable of transmitting different signals; an entrance station and an operator's station both having manually operable person identifying control means for identifying a person who is checking into or checking out of the establishment; said entrance station further having pager receiver units each capable of receiving a different signal of said transmitter, manually operable check-in and check-out control means and manually operable check-in with pager control means for identifying the fact that the person checking in has removed a pager receiver unit from the entrance station; and said operator's station including a transmitter turn-on control means, memory means associated with each pager receiver unit, each memory means including storage means for storing information on the identity of the person checking out the associated pager receiver unit; means responsive to said check-in with pager control means and person identifying control means at an entrance station for identifying to the operator at said operator's station that the person so identified has checked in and taken a pager for storing information in the associated storage means the identity of the person taking out the associated pager receiver unit when the pager receiver is removed from the entrance station and for removing said information in the storage means when the associated pager receiver unit is returned to said entrance station, whereby to clear the memory circuit for information on a new person taking the pager receiver unit; and means responsive to said memory circuits and the operation of said transmitter turn-on and person identifying control means at the operator's station for operating the channel of the transmitter which transmits the signal which can be received by the pager receiver unit checked-out by the person identified by the operation of said person identifying control means at said operator's station.

5. In a system for checking personnel into and out of an establishment and for enabling an operator to communicate to a person who has checked in, the system including: a multi-channel transmitter capable of transmitting different signals; an entrance station and an operator's station both having manually operable person identifying control means for identifying a person who is checking into or out of the establishment; said entrance station further having pager receiver units each capable of receiving a different signal of said transmitter, manually operable check-in and check-out control means and manually operable check-in with pager control means for identifying the fact that the person checking in has removed a pager receiver unit from the entrance station; and said operator's station including a transmitter turn-on control means; display means visible to the operator at said operator's station and including check-in signalling means and pager signalling means for each person; memory means associated with each pager receiver unit, each memory means including storage means for storing information on the identity of the person checking-out the associated pager receiver unit; means responsive to said check-in with pager control means and person identifying control means at an entrance station for storing information in the associated storage means the identity of the person taking out the associated pager receiver unit when the pager receiver unit is removed from the entrance station and for removing said information in the storage means when the associated pager receiver unit is returned to said entrance station, whereby to clear the memory circuit for information on a new person taking the pager receiver unit; means responsive to the operation of said entrance station person identifying and check-in control means for operating said display check-in signalling means of the person involved to indicate that the person has checked into the establishment and responsive to the operation of the entrance station check-out control means for removing the indication of the latter signalling means; means responsive to the operation of said entrance station check-in with pager and person identifying control means for operating said display pager signalling means of the person involved to indicate to the operator to the person involved has taken a pager receiver unit and responsive to the operation of the entrance station check-out control means for removing the indication of the pager signalling means of the person involved; and means responsive to said memory circuits and the operation of said transmitter turn-on and person identifying control means at the operator's station for operating the channel of the transmitter which transmits the signal which can be received by the pager receiver unit checked out by the person identified by the operation of said person identifying control means at said operator's station.

6. The system of claim 5 wherein said operator's station further includes message-in and message-out control means, said display means further including message signalling means for each person, and there is provided means responsive to the operation of the operator's station message-in and person identifying control means for operating the message identifying signalling means of the person involved to indicate that the person has a message, and responsive to the operation of the operator's station message-out and person identifying control means for removing the indication of the message signalling means of the person involved.

7. A register system for checking personnel into and out of an establishment, said system comprising: a number of stations each having manually operable person identifying control means for identifying a person who is checking into the establishment, a readout window for displaying the identity of the person identified by the operation of any of the person identifying control means, and manually operable check-in and check-out control means; readout panel means having assigned to each of the persons involved a check-in section with a check-in signalling means; means responsive to the operation of said person identifying control means at any of said stations for displaying on all of said readout windows information on the person identified by the operation of the person identifying control means involved until said check-in or check-out control means is operated; and means responsive to the operation of said person identifying and check-in control means at any of said stations for continuously operating the check-in signalling means on said readout panel for the person involved and responsive to the operation of the person identifying and check-out control means at any station for resetting and removing the indication of the check-in signalling means of the person involved.

8. A register system for checking personnel into and out of an establishment, said system comprising: a number of stations each having manually operable person identifying control means for identifying a person who is checking into the establishment, a readout window for displaying the identity of the person identified by the operation of any of the person identifying control means, manually operable cancel control means for cancelling the effect of the operation of the entrance station person identifying control means and check-in and check-out control means; readout panel means having assigned to each of the persons involved a check-in section with a check-in signalling means; means responsive to the operation of said person identifying control means at any of said stations for displaying on all of said readout windows information on the person identified by the operation of the person identifying control means involved; means responsive to the operation of said person identifying and check-in control means at any of said stations for operating the check-in signalling means on said readout panel for the person involved and responsive to the operation of the person identifying and check-out control means at any station for removing the indication of the check-in signalling means of the person involved; and means responsive to the operation of said check-in and check-out control means at any station for removing the indication on said readout windows and clearing the system for a new check-in or check-out operation.

9. A register system for checking personnel into and out of an establishment, said system comprising: an entrance station and an operator's station both having manually operable person identifying control means for identifying a person who is checking into or out of, the establishment, and manually operable check-in and check-out control means; and said operator's station further having message-in and message-out control means; a readout panel visible to the operator and having individual areas thereon respectively assigned to said personnel, each area including a message section with a message signalling means and a check-in section with a check-in signalling means; means responsive to the operation of said entrance station person identifying means and check-in control means for operating the check-in signalling means on said readout panel for the person involved and responsive to the operation of the entrance station person identifying and check-out control means for removing the indication of the check-in signalling means of the person involved; and means responsive to the operation of the operator's station message-in and person identifying control means for operating the message signalling means on the readout panel for the person involved and responsive to the operation of the operator's station person identifying and message-out control means for removing the indication of the message signalling means of the person involved.

10. A register system for checking personnel into and out of an establishment, said system comprising: an entrance station and an operator's station both having manually operable person identifying control means for identifying a person who has checked into, or who is checking out of, the establishment, and manually operable check-in and check-out control means; and said operator's station further having message-in and message-out control means, and display means including a common check-in signalling means and a common message signalling means; a readout panel having individual areas therein respectively assigned to said personnel, each area including a message section with a message signalling means and a check-in section with a check-in signalling means; means responsive to the operation of said entrance station person identifying means and check-in control means for operating the check-in signalling means on said readout panel for the person involved, and responsive to the operation of the entrance station person identifying and check-out control means for removing the indication of the check-in signalling means of the person involved; means responsive to the operation of the operator's station message-in and person identifying control means for operating the message signalling means on the readout panel for the person involved and responsive to the operation of the operator's station person identifying and message-out control means for removing the indication of the message signalling means of the person involved; and means responsive to the operation of the operator's station person identifying control means for energizing the common check-in signalling means if the person identifying means on the readout panel indicates that the person involved has checked in and for operating the common message signalling means if the message signalling means on the readout panel assigned to the person involved indicates that there is a message for such person.

11. A register system for checking personnel into and out of an establishment, said system comprising an entrance station and an operator's station both having manually operable person identifying control means for identifying a person who has checked into, or who is checking out of the establishment, and a readout window for displaying the identity of the person identified by the operation of any of the person identifying control means; said entrance station further having manually operable control means for cancelling the effect of the operation of the entrance station person identifying control means check-in and check-out control means; said operator's station further having message-in and message-out control means; a readout panel having individual areas thereon respectively assigned to each of the persons involved each area including a message section with a message signalling means and a check-in section with a check-in signalling means; means responsive to the operation of said person identifying control means at said entrance and operator's stations for displaying on all of said readout windows information on the person identified by the operation of the person identifying control means involved; means responsive to the operation of said entrance station person identifying and check-in control means for operating the check-in signalling means on said readout panel for the person involved and responsive to the operation of the entrance station person identifying and check-out control means for removing the indication of the check-in signalling means of the person involved; and means responsive to the operation of the operator's station message-in and person identifying control means for operating the message signalling means on the readout panel for the person involved and responsive to the operation of the operator's station person identifying and message-out control means for removing the indication of the message signalling means of the person involved.

12. In a system for checking personnel into and out of an establishment, the system including an entrance station and an operator's station both having manual operable person identifying control means for setting the digits of a number or the like identifying a person checking into or out of the establishment and cancel control means, the improvement comprising: a readout display means including a person identifying section with individual person signaling means for each person, a digit number register for respectively registering the digits of the number set up on the person identifying control means of said entrance and operator's stations, each of said signalling means of said display means having associated therewith a memory means, means responsive to the number set in said number register and the operation of the entrance station check-in control means for setting the memory means of the check-in signalling means of the person whose number is set in the number register, and responsive to the number set in said number register and the operation of the entrance station check-out control means for resetting the memory means of the signalling means of the person whose number is set in the number register; means responsive to the operation of the cancel control means of both the entrance and operator stations for clearing the number register; and means coupling each memory means to the associated signalling means for operating the signalling means to provide an indication when the associated memory means is set and for removing the indication from each signalling means when the associated memory means is reset.

13. The system of claim 12 wherein there is integrated therewith a pager system for enabling the operator at the operator's station to communicate with a person who has checked-in, the system including a multi-channel wireless transmitter capable of transmitting different signals; said entrance station further having pager receiver units each capable of receiving a different signal of said wireless transmitter, pager receiver unit sensing means for each pager receiver unit for sensing the removal of the associated pager receiver unit from the entrance station and the return thereof to the entrance station; said operator's station having a transmitter turn-on control means for energizing said transmitter; a memory circuit associated with each pager receiver unit, each memory circuit including storage means for storing at least the tens and units digits of the various numbers assigned to the personnel using the system; means responsive to the number set up in the number register for preparing all of the storage means to store the tens and units digits of the number set in said number register when a store signal is received thereby, said pager receiver unit sensing means associated with each pager receiver unit extending to a different pager memory circuit and including means for generating a store signal each time the associated pager receiver is removed from the entrance station which will store the number set in the number register in the associated prepared memory circuit, and for generating a storage clear signal each time the associated pager receiver unit is returned to the entrance station which effects clearing of the number stored in the associated memory circuit; and means responsive to the operation of the transmitter turn-on control means and the number set in the number register for operating the channel of the transmitter which generates a signal which can be received by the pager receiver unit of the memory circuit having a number stored therein corresponding to the number set in the number register.

14. The system of claim 13 wherein the storage means in each pager memory circuit includes sets of SCR devices respectively representing the decimal digits of the number set up in the number register, means connecting said register to said SCR devices for preparing the same for firing into a high conductive state those SCR devices associated with the digits set in the number register when the associated pager receiver unit sensing means generates said store signal, means in each memory circuit responsive to the clearing of the number register for changing the high conductive state of any SCR device to a low conducting state until the feeding of a storage clear signal to the memory circuit involved which will result in the extinguishment of the low conducting SCR devices, the high conduction of the low conducting SCR devices being reestablished when the number represented by the low conducting SCR devices of any memory circuit is once again set in the number register, and means in each memory circuit responsive to the high conducting state of the SCR devices representing all the digits of the number set up in the number register for preparing the transmitter to transmit the signal which can be received by the associated pager receiver unit when the transmitter-on control means at the operator's station is operated.

15. In a system for checking personnel into and out of an establishment, the system including an entrance station and an operator's station both having manual operable person identifying control means for setting a number or the like identifying a person checking into or out of the establishment and a readout window for displaying the number of the person checking into or out of the establishment; and cancel control means; said entrance station further having manually operable check-in and check-out control means; the improvement comprising: readout display means including a person identifying section with individual person signalling means for each person, each of said signalling means of said display means having associated therewith a memory means; a number register for registering the number set up on the person identifying control menas of said entrance and operator's stations; means responsive to the operation of the cancel control means of both the entrance and operator's station for clearing the number register; means responsive to the number set in the number register for providing in all of said readout windows the number set in the number register and to remove the indication in all the display windows when the number register is cleared; means responsive to the number set in said number register and the operation of the entrance station check-in control means for setting the memory means of the check-in signalling means of the person whose number is set in the number register, and responsive to the number set in said number register and the operation of the entrance station check-out control means for resetting the memory means of the signalling means of the person whose number is set in the number register; and means coupling each memory means to the associated signalling means for operating the signalling means to provide an indication when the associated memory means is set and for removing the indication from each signalling means when the associated memory means is reset.

16. In a system for checking personnel into and out of an establishment; the system including an entrance station and an operator's station both having manual operable person identifying control means for setting the digits of a number identifying a person checking into or out of the establishment, and cancel control means; said entrance station further having manually operable check-in and check-out control means; and said operator's station further having message-in and message-out control means; the improvement comprising: readout display means visible to the operator at the operator's station and including individual areas thereon respectively assigned to the personnel involved, each area including a message section with an individual message signalling means for each person and a person identifying section with individual person signalling means for each person; each of said signalling means of said display means having associated therewith a memory means; a digit number register for respectively registering the digits of the number set up on the person identifying control means of said entrance and operator's station; means responsive to the operation of the cancel control means of both the entrance and operator's station for clearing the number register; mean responsive to the number set in the number register for providing in all of said readout windows the number set in the number register and to remove the indication in all the display windows when the number register is cleared; means responsive to the number set in said number register and the operation of the entrance station check-in control means for setting the memory means of the check-in signalling means of the person whose number is set in the number register, and responsive to the number set in said number register and the operation of the entrance station check-out control means for resetting the memory means of the signalling means of the person whose number is set in the number register; means responsive to the number set in said number register and the operation of the message-out control means of the operator's station for setting the memory means associated with the message signalling means of the person whose number is set up in the number register, and responsive to the number set in the number register and the message-out control means of the operator's station for resetting the memory means assigned to the message signalling means of the person identified by the number in the number register; and means coupling each memory means to the associated signalling means for operating the signalling means to provide an indication when the associated memory means is set and for removing the indication from each signalling means when the associated memory means is reset.

References Cited

UNITED STATES PATENTS

| | | | |
|---|---|---|---|
| 2,971,806 | 2/1961 | Andreitsen | 340—311 X |
| 3,092,689 | 6/1963 | Sandstrom | 340—312 X |

JOHN W. CALDWELL, *Primary Examiner.*

H. I. PITTS, *Assistant Examiner.*

U.S. Cl. X.R.

340—312, 286